(12) United States Patent  
Ciarfello

(10) Patent No.: US 8,491,034 B1  
(45) Date of Patent: Jul. 23, 2013

(54) SLIDE-OUT ROOM ROOF ACCESS SYSTEM

(76) Inventor: Timothy L. Ciarfello, Seattle, WA (US)

( * ) Notice: Subject to any disclaimer, the term of this patent is extended or adjusted under 35 U.S.C. 154(b) by 239 days.

(21) Appl. No.: 12/928,513

(22) Filed: Dec. 14, 2010

(51) Int. Cl.
*B60R 15/00* (2006.01)

(52) U.S. Cl.
USPC ......... 296/175; 296/165; 296/171; 296/26.13

(58) Field of Classification Search
USPC .............. 296/165, 171, 172, 175, 176, 26.09, 296/26.13, 173, 26.12; 52/67
See application file for complete search history.

(56) References Cited

U.S. PATENT DOCUMENTS 7,100,967 B2 * 9/2006 Shea .............................. 296/175

* cited by examiner

*Primary Examiner* — Stephen Gordon

(57) ABSTRACT

A recreation vehicle has forward and rearward ends, sides, and a roof. At least one of the laterally spaced sides is a functional side with a rectangular vertical side aperture. A slide-out room has forward and rearward ends, a floor, a ceiling, sides, and a roof. Supports are extendable through the side aperture and reciprocally couple the slide-out room and the recreational vehicle. A roof aperture of a size to permit movement of a user there through is formed in the roof of the slide-out room. A hatch covers the roof aperture.

5 Claims, 3 Drawing Sheets

FIG. 1
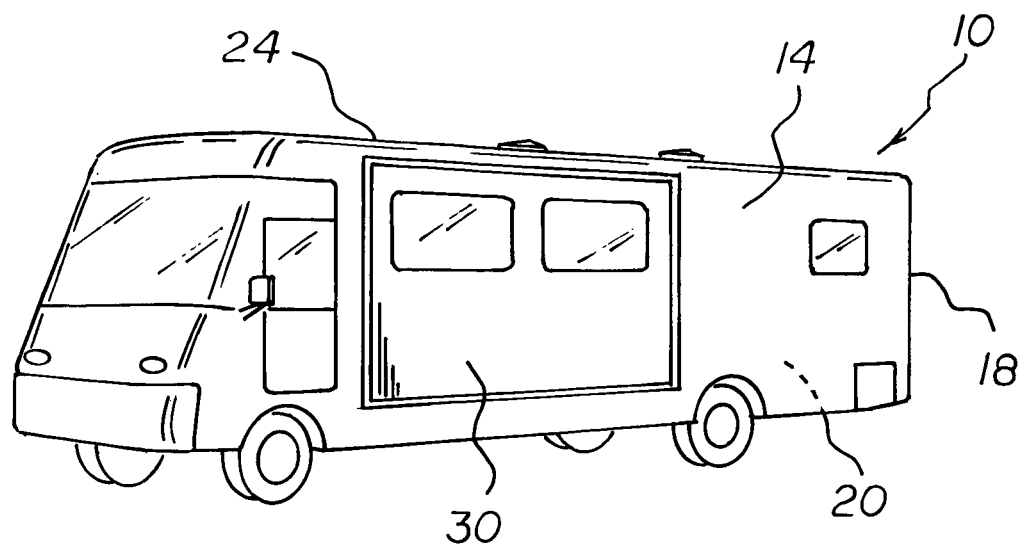
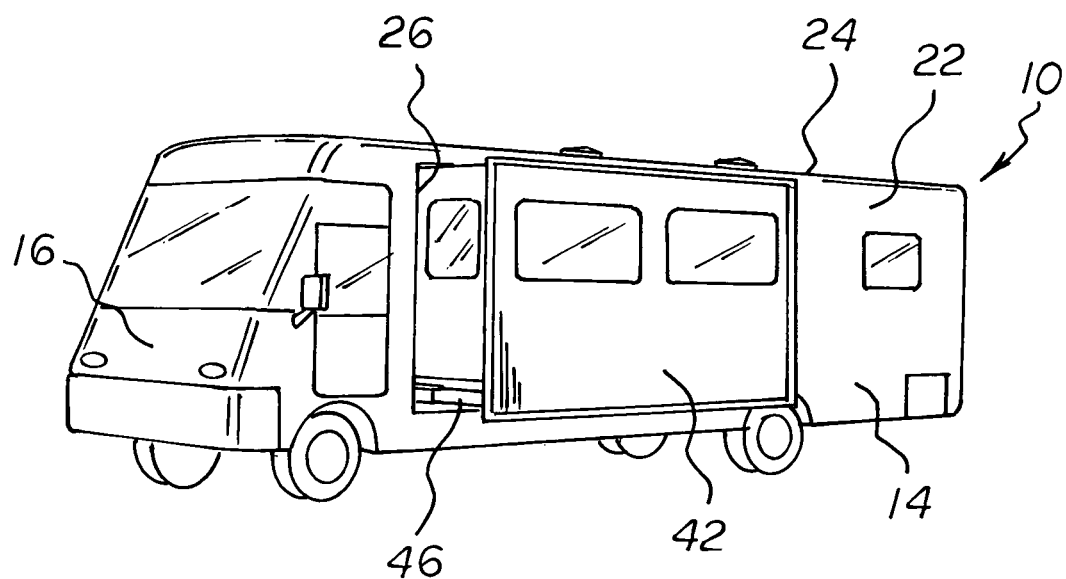
FIG. 2

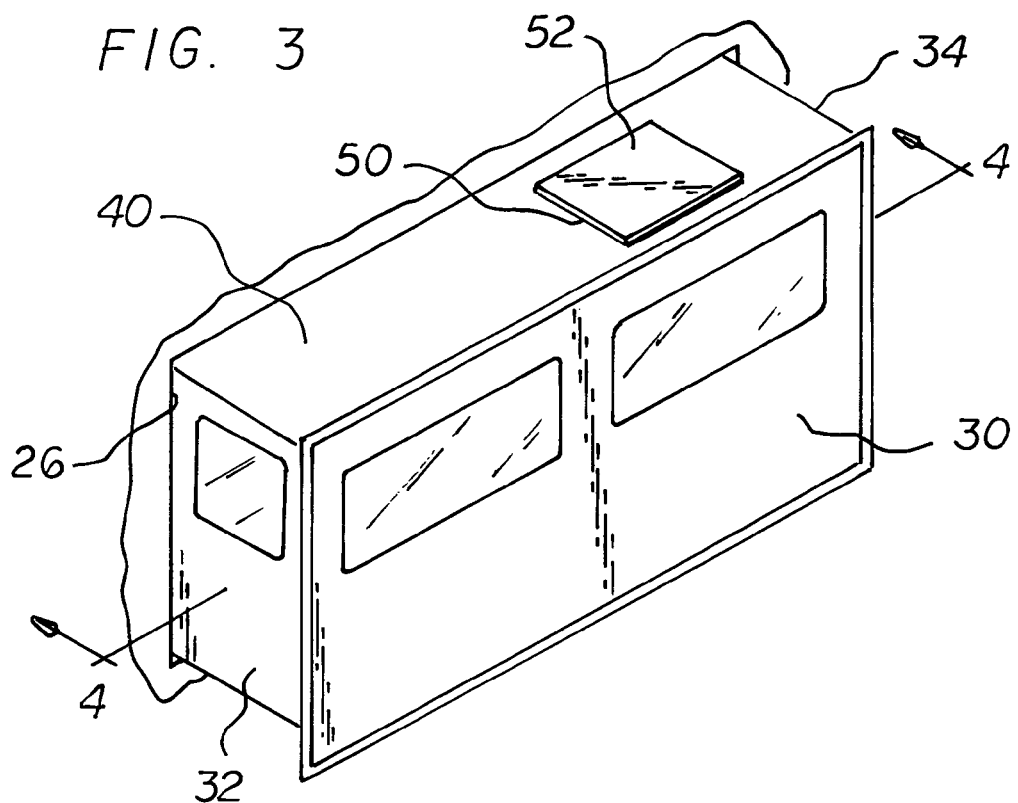
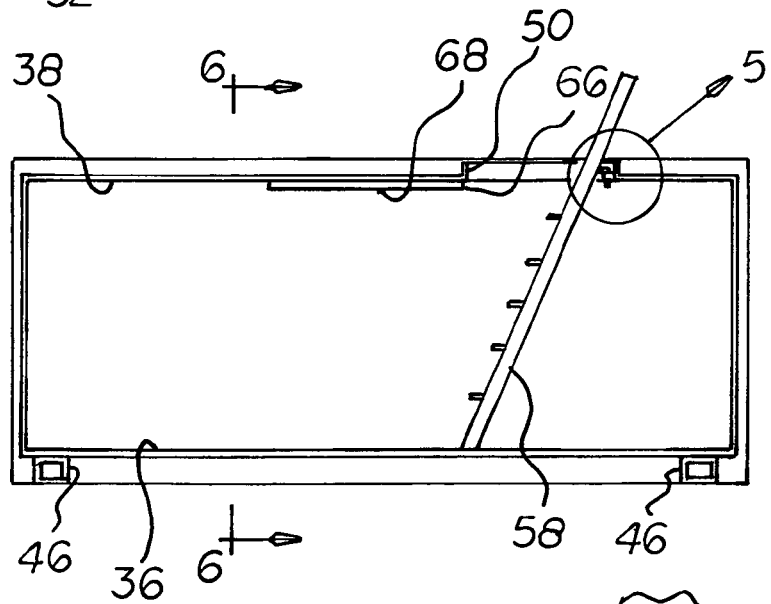
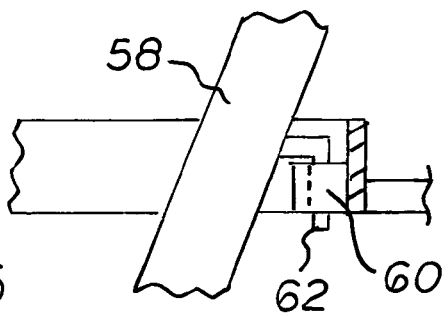

SLIDE-OUT ROOM ROOF ACCESS SYSTEM

BACKGROUND OF THE INVENTION

1. Related Application
2. Field of the Invention

The present invention relates to recreational vehicles and, more particularly, pertains to a slide-out room roof access system for facilitating roof access and providing structures for climbing to and from the roofs of a slide-out room and a recreational vehicle, the facilitating and climbing being done in a safe and convenient and economical manner.

3. Description of the Prior Art

The use of recreational vehicle roof access systems of known designs and configurations is known in the prior art. More specifically, recreational vehicle roof access systems of known designs and configurations previously devised and utilized for the purpose of providing access to roofs of recreational vehicles are known to consist basically of familiar, expected, and obvious structural configurations, notwithstanding the myriad of designs encompassed by the crowded prior art which has been developed for the fulfillment of countless objectives and requirements.

By way of example, a typical recreational vehicle ladder is described in U.S. Pat. No. 4,151,895 issued to Rassada, Jr. et al. This ladder presents a long, steep climb with a challenging transition between the ladder and roof on assent or descent. An external ladder becomes slippery when exposed to water, road grime and oil. This type of ladder presents a daunting climb to most people. This type of ladder is inexpensive, widely used and potentially dangerous.

An improved ladder is described in U.S. Pat. No. 6,378,654 to Ziaylek, Jr., et al. This ladder can pivot outwardly from the lower vehicle to achieve a better climbing angle. The transition on and off the roof remains a challenge. Moisture and road grime can make any external ladder slippery.

Publication No. U.S.2003/0094827 to Faludy et al. describes a long collapsible ladder extending from the ground to a rooftop deck. This attempt to allow routine access to a rooftop living area still presents a long climb. This is a heavy and complicated apparatus.

A roof hatch and stairway to access a roof deck are described in U.S. Pat. No. 6,237,988 issued to Messano. This hatch puts a large opening in the carefully engineered roof of a luxury recreational vehicle. Various internal components of the roof might have to be repositioned or modified to accommodate this hatch. The hatch has to be waterproof. Waterproofing when the vehicle is parked is a small challenge, however, when the vehicle is moving at highway speed through rain, the challenge is considerable. This hatch will resemble the hatch on a boat or ship. This hatch should also provide insulation from weather and road noise at least equal to the roof material removed for the hatch installation. This hatch is well within current recreational vehicle art. This hatch will be costly, but worth it on a premium priced recreational vehicle.

U.S. Pat. No. 6,729,678 issued to Itty Atcravi shows a recreational vehicle with multiple stories and slide-out rooms. A hatch above a stairway is used to access the vehicle roof. This hatch must protect the vehicle interior when traveling at highway speeds.

U.S. Pat. No. 6,637,804 issued to Crean includes a recreational vehicle with a slide-out room. A door in the slide-out end accesses a stairway leading to the ground. When the vehicle is in motion, the slide-out is retracted into the vehicle. The door is never exposed to the wind, weather or noise of an external door on a moving recreational vehicle. This can be a simple to engineer and modestly priced feature.

While these devices fulfill their respective, particular objectives and requirements, the aforementioned patents do not describe a slide-out room roof access system that allows facilitating roof access and providing structures for climbing to and from the roofs of a slide-out room and a recreational vehicle.

In this respect, the slide-out room roof access system according to the present invention substantially departs from the conventional concepts and designs of the prior art, and in doing so provides an apparatus primarily developed for the purpose of facilitating roof access and providing structures for climbing to and from the roofs of a slide-out room and a recreational vehicle.

Therefore, it can be appreciated that there exists a continuing need for a new and improved recreational vehicle roof access system which can be used for facilitating roof access and providing structures for climbing to and from the roofs of a slide-out room and a recreational vehicle. In this regard, the present invention substantially fulfills this need.

SUMMARY OF THE INVENTION

In view of the foregoing disadvantages inherent in the types of recreational vehicle roof access systems of known designs and configurations now present in the prior art, the present invention provides a new and improved recreational vehicle roof access system for climbing to and from the roofs of a slide-out room and a recreational vehicle. As such, the general purpose of the present invention, which will be described subsequently in greater detail, is to provide a new and improved recreational vehicle roof access system and method which has all the advantages of the prior art and none of the disadvantages.

To attain this, the present invention essentially comprises a slide-out room roof access system and, more particularly, a modified recreational vehicle slide-out room for facilitating roof access and for providing structures for climbing to and from the roofs of a slide-out room and a recreational vehicle. The facilitating and climbing are done in a safe and convenient and economical manner.

First provided is a recreation vehicle having a forward end, a rearward end, laterally spaced sides, and a roof. The roof of the recreational vehicle is in an essentially horizontal plane. At least one of the laterally spaced sides is a functional side having a rectangular vertical side aperture.

Next provided is a slide-out room. The room has a forward end, a rearward end, a floor, a ceiling, laterally spaced sides, and a roof. The roof of the slide-out room has a length and a width. One of the laterally spaced sides of the slide-out room is an exposed side. The roof of the slide-out room is in a plane sloping downwardly toward the exposed side for rain runoff purposes.

Telescoping supports are next provided. The telescoping supports extend through the side aperture and couple the slide-out room and the recreational vehicle. The slide-out room is movable horizontally between a retracted orientation within the recreational vehicle and an extended orientation exterior of the recreational vehicle.

Next, a rectangular roof aperture is formed in the roof of the slide-out room. The roof aperture is of a size to permit movement of a user there through. The roof aperture has side edges separated by a width between 70 and 80 percent of the width of the roof. The roof aperture has forward and rearward edges separated by a length between 20 and 30 percent of the length of the roof. A rectangular hatch is provided of a size to cover the roof aperture. A hinge pivotally couples the hatch to the roof of the slide-out room adjacent to and parallel with the exposed side. The hatch is movable between a closed orientation overlying the roof aperture and an open orientation extending upwardly at an obtuse angle from the roof of the slide-out room.

A ladder is next provided. The ladder has a lower end supported on the floor of the slide-out room, an upper end located above the roof of the slide-out room, and an intermediate extent extending through the roof aperture. Laterally spaced recesses are formed in the roof aperture adjacent to the rearward edge of the slide-out room. The ladder has laterally spaced downwardly extending projections adjacent to the upper end. The projections are positionable in the recesses for selectively securing the ladder to the slide-out room during use while a user climbs to and from the roof of the slide-out room and the roof of the recreational vehicle.

Lastly, a screening assembly is provided. The screening assembly including a generally rectangular screen with peripheral tubing beneath the roof aperture. The screen and tubing have a size to essentially cover the roof aperture. The screen and tubing have forward and rearward edges and lateral side edges. Laterally spaced guides are secured to the ceiling of the slide-out room and span the roof aperture. The guides are formed with channels slidably receiving the tubing along the lateral side edges of the screen. The tubing is reciprocable in the channels between a closed position closing the roof aperture and an open position opening the roof aperture. The tubing adjacent the rearward edge has indents to receive the ladder when in the closed position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved recreational vehicle roof access system which can be used for facilitating roof access and providing structures for climbing to and from the roofs of a slide-out room and a recreational vehicle which has all of the advantages of the prior art recreational vehicle roof access systems of known designs and configurations and none of the disadvantages.

It is another object of the present invention to provide a new and improved recreational vehicle roof access system which can be used for facilitating roof access and providing structures for climbing to and from the roofs of a slide-out room and a recreational vehicle which may be easily and efficiently manufactured and marketed.

It is further object of the present invention to provide a new and improved recreational vehicle roof access system which can be used for facilitating roof access and providing structures for climbing to and from the roofs of a slide-out room and a recreational vehicle which is of durable and reliable constructions.

An even further object of the present invention is to provide a new and improved recreational vehicle roof access system which can be used for facilitating roof access and providing structures for climbing to and from the roofs of a slide-out room and a recreational vehicle which is susceptible of a low cost of manufacture with regard to both materials and labor, and which accordingly is then susceptible of low prices of sale to the consuming public, thereby making such slide-out room roof access system economically available to the buying public.

Even still another object of the present invention is to provide a slide-out room roof access system for facilitating roof access and providing structures for climbing to and from the roofs of a slide-out room and a recreational vehicle.

Still another object of the present invention is to provide a roof access system that is independent from the recreational vehicle roof.

Yet another object of the present invention is to provide a roof access system that will enhance vehicle security.

A further object of the present invention is to provide the user a safer roof access system.

Lastly, it is an object of the present invention to provide a new and improved recreation vehicle with forward and rearward ends, sides, and a roof. At least one of the laterally spaced sides is a functional side with a rectangular vertical side aperture. A slide-out room has forward and rearward ends, a floor, a ceiling, sides, and a roof. Supports are extendable through the side aperture and reciprocably couple the slide-out room and the recreational vehicle. A roof aperture of a size to permit movement of a user there through is formed in the roof of the slide-out room. A hatch is provide of a size to cover the roof aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a recreational vehicle with a slide-out room roof access system constructed in accordance with the principles of the present invention.

FIG. 2 is a perspective illustration of a recreational vehicle with a slide-out room roof access system as shown in FIG. 1 but with the slide-out extended.

FIG. 3 is an enlarged perspective illustration of the slide-out room shown in FIG. 2.

FIG. 4 is a cross sectional view taken along line 4-4 of FIG. 3.

FIG. 5 is an enlarged showing of a portion of the system taken at Circle 5 of FIG. 4.

The same reference numerals refer to the same parts throughout the various Figures.

DESCRIPTION OF THE PREFERRED EMBODIMENT

Figure 6:
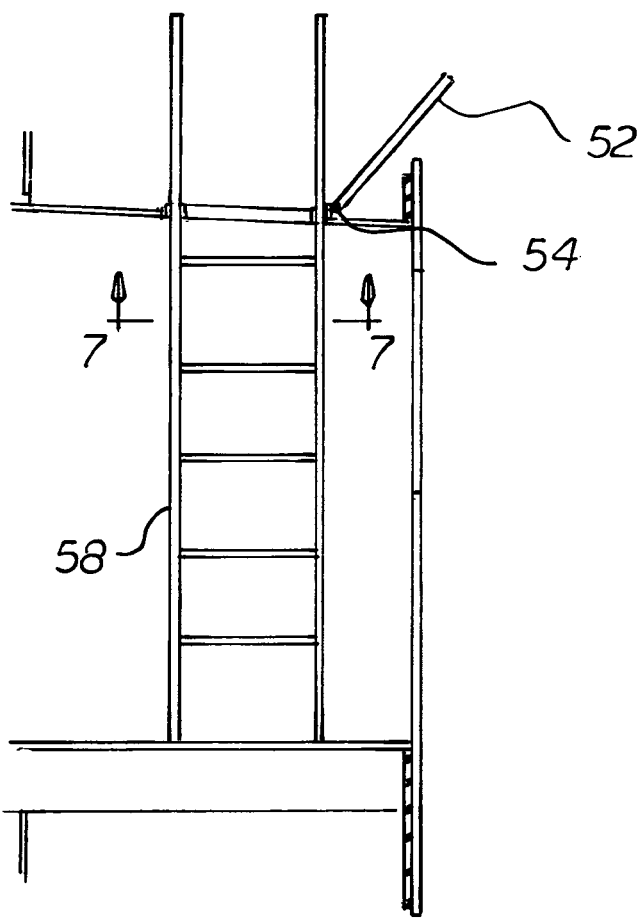
FIG. 6 is a cross sectional view taken along line 6-6 of FIG. 4.

With reference now to the drawings, and in particular to FIG. 1 thereof, the preferred embodiment of the new and improved slide-out room roof access system embodying the principles and concepts of the present invention and generally designated by the reference numeral 10 will be described.

The present invention, the slide-out room roof access system 10 is comprised of a plurality of components. Such components in their broadest context include a recreation vehicle, a slide-out room, supports, and a roof aperture. Such components are individually configured and correlated with respect to each other so as to attain the desired objective.

The present invention is a slide-out room roof access system 10 and, more particularly, pertains to a recreational vehicle roof access system which can be used for facilitating roof access and providing structures for climbing to and from the roofs of a slide-out room and a recreational vehicle. The facilitating and climbing are done in a safe and convenient and economical manner. First provided is a recreation vehicle 14 having a forward end 16, a rearward end 18, laterally spaced sides 20, 22, and a roof 24. The roof of the recreational vehicle is in an essentially horizontal plane. At least one of the laterally spaced sides is a functional side 22 having a rectangular vertical side aperture 26.

Next provided is a slide-out room 30. Note in particular, FIGS. 3 and 4. The room has a forward end 32, a rearward end 34, a floor 36, a ceiling 38, laterally spaced sides, and a roof 40. The roof of the slide-out room has a length and a width. One of the laterally spaced sides of the slide-out room is an exposed side 42. The roof of the slide-out room is in a plane sloping downwardly toward the exposed side for rain runoff purposes.

Telescoping supports 46 are next provided. The telescoping supports extend through the side aperture and couple the slide-out room and the recreational vehicle. The slide-out room is movable horizontally between a retracted orientation within the recreational vehicle and an extended orientation exterior of the recreational vehicle.

Next, a rectangular roof aperture 50 is formed in the roof of the slide-out room. The roof aperture is of a size to permit movement of a user there through. The roof aperture has side edges separated by a width between 70 and 80 percent of the width of the roof. The roof aperture has forward and rearward edges separated by a length between 20 and 30 percent of the length of the roof. A rectangular hatch 52 is provided of a size to cover the roof aperture. A hinge 54, shown in FIG. 6, pivotally couples the hatch to the roof of the slide-out room adjacent to and parallel with the exposed side. The hatch is movable between a closed orientation overlying the roof aperture and an open orientation extending upwardly at an obtuse angle from the roof of the slide-out room. Compare FIGS. 3 and 6. A hatch through the RV roof is thus provided. The hatch is also a low profile hatch allowing it to be slid into the recreational vehicle and outwardly therefrom as shown in FIGS. 1 and 2. Note that when the slide-out room is retracted into the recreational vehicle, the hatch is protected within the vehicle. The hatch is never exposed to the wind, weather or road noise of an external hatch on a moving recreational vehicle.

A ladder 58 is next provided. The ladder has a lower end supported on the floor of the slide-out room, an upper end located above the roof of the slide-out room, and an intermediate extent extending through the roof aperture. Laterally spaced recesses 60 are formed in the roof aperture adjacent to the rearward edge of the slide-out room. The ladder has laterally spaced downwardly extending projections 62 adjacent to the upper end. The projections are positionable in the recesses for selectively securing the ladder to the slide-out room during use while a user climbs to and from the roof of the slide-out room and the roof of the recreational vehicle.

Figure 7:
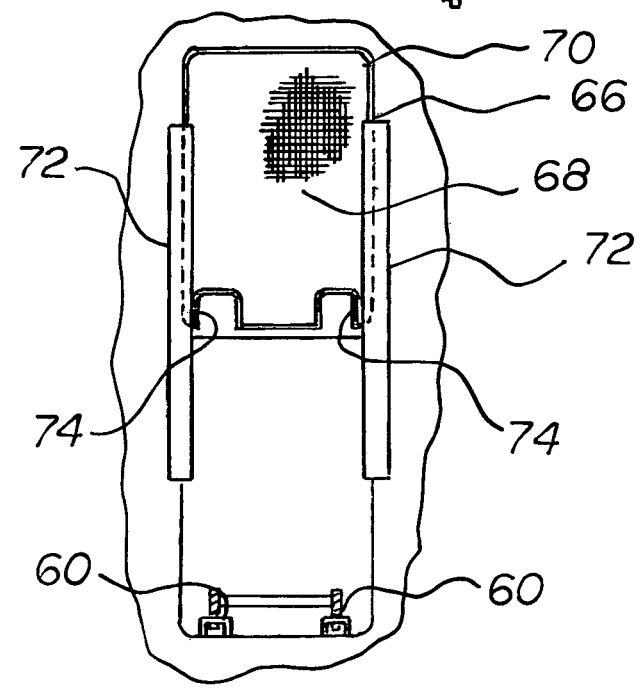
FIG. 7 is a cross sectional view taken along line 7-7 of FIG. 6.

Lastly, a screening assembly 66 is provided. Note FIG. 7. The screening assembly including a generally rectangular screen 68 with peripheral tubing 70 beneath the roof aperture. The screen and tubing have a size to essentially cover the roof aperture. The screen and tubing have forward and rearward edges and lateral side edges. Laterally spaced guides 72 are secured to the ceiling of the slide-out room and span the roof aperture. The guides are formed with channels slidably receiving the tubing along the lateral side edges of the screen. The tubing is reciprocable in the channels between a closed position closing the roof aperture and an open position opening the roof aperture. The tubing adjacent the rearward edge has indents 74 to receive the ladder when in the closed position.

Recreational vehicles such as motor homes and travel trailers are a popular form of transportation, vacation travel and mobile living. They provide living space that can be moved over roads. The size of a recreational vehicle is limited by the dimensional restrictions for operating on public roads. To increase living space, the vehicles often include one or more slide-out rooms. The slide-out rooms are stored within the vehicle when traveling and extended when the vehicle is parked. Telescoping beams, levers, pivoting actuators, tracks or cables can be used as supports for the slide-out rooms and to extend or retract the rooms. The slide-out rooms are relatively simple structures compared to the recreational vehicle. The slide-out room roof, for example, will never be exposed to the high speed wind, rain and road noise that the recreational vehicle roof will encounter.

The recreational vehicle roof requires occasional to frequent access. The roof is periodically washed, inspected for wear, and leaks must be prevented or repaired. The vehicle roof also supports accessories such as air conditioners, vents and antennae. Roof top accessories are installed, wear out, break or need upgrading. A recreational vehicle might also have a living area on the roof that will be frequently visited.

Access to the roof of a recreational vehicle is most often by the use of an external ladder. In most vehicles, the ladder is custom made to attach permanently to the vehicle exterior. An external ladder can be an invitation to the curious, or worse, the mischievous. The permanent ladder may incorporate a removable or foldable lower section to deter unwanted access to the roof. The roof of a recreational vehicle is quite high off the ground. A ladder from the ground to the roof presents a long climb. This ladder is exposed to the elements; a mistake or a slip can result in a dangerous fall. The external ladder is a safety, security and liability problem.

Another well known system to reach a recreational vehicle roof is a door or hatch on the vehicle roof that allows movement, through an aperture, between the vehicle interior and the roof. Pop-up, sliding or hinged hatches are common. A stairway, a ladder or a piece of furniture can be used as structures to climb from the vehicle interior floor to the roof. This stairway or ladder will be shorter than an external stairway or ladder extending from the ground to the roof. The interior of the vehicle is protected from weather and road grime, the interior stair or ladder will also be protected. The transition from the interior stair or ladder to the roof is safer and less intimidating than an external ladder transition. The proximity of roof structure surrounding the opening provides the user visual and physical support. The recreational vehicle roof hatch also addresses security concerns of an external ladder.

A recreational vehicle has a roof that is carefully engineered to protect the vehicle and its content from the elements. The roof is well insulated for climate control and to reduce interior noise when the vehicle is traveling on the road. Ducts for heating and cooling are often built into the roof as are conduits for electrical components.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A slide-out room roof access system comprising:
   a recreation vehicle having forward and rearward ends and laterally spaced sides and a roof, at least one of the laterally spaced sides being a functional side with a rectangular vertical side aperture;
   a slide-out room having forward and rearward ends and a floor and a ceiling and sides and a roof;
   supports extendable through the side aperture and reciprocably coupling the slide-out room and the recreational vehicle;
   a roof aperture formed in the roof of the slide-out room, the roof aperture being of a size to permit movement of a user there through;
   a hatch of a size to cover the roof aperture; and
   a ladder having a lower end supported in the slide-out room and an upper end positioned to allow a user to climb and descend through the roof aperture.

2. The system as set forth in claim 1 and further including a hinge pivotally coupling the hatch to the roof of the slide-out room.

3. The system as set forth in claim 1 wherein the upper end of the ladder is located above the roof of the slide-out room, the ladder having an intermediate extent extending through the roof aperture, laterally spaced recesses formed in the roof aperture adjacent to the rearward end of the slide-out room, the ladder having laterally spaced downwardly extending projections adjacent to the upper end, the projections being positionable in the recesses for selectively securing the ladder to the slide-out room during use.

4. The system as set forth in claim 1 and further including:
   a screening assembly having a generally rectangular screen with peripheral tubing beneath the roof aperture, the screen and tubing having a size to essentially cover the roof aperture, the screen and tubing having forward and rearward edges and lateral side edges, laterally spaced guides secured to the ceiling of the slide-out room and spanning the roof aperture, the guides being formed with channels slidably receiving the tubing along the lateral side edges of the screen, the tubing being reciprocable in the channels between closed and open positions.

5. A slide-out room roof access system (10) and more particularly to a modified recreational vehicle slide-out room for facilitating slide-out room roof access and for providing structures for climbing to and from the slide-out room roof, the facilitating and climbing being done in a safe and convenient and economical manner, the system comprising, in combination:
   a recreation vehicle (14) having a forward end (16) and a rearward end (18) and laterally spaced sides (20)(22) and a roof (24), the roof of the recreational vehicle being in an essentially horizontal plane, at least one of the laterally spaced sides being a functional side (22) with a rectangular vertical side aperture (26);
   a slide-out room (30) having a forward end (32) and a rearward end (34) and a floor (36) and a ceiling (38) and laterally spaced sides and a roof (40), the roof of the slide-out room having a length and a width, one of the laterally spaced sides of the slide-out room being an exposed side (42), the roof of the slide-out room being in a plane sloping downwardly toward the exposed side for rain runoff purposes;
   telescoping supports (46) extendable through the side aperture and coupling the slide-out room and the recreational vehicle, the slide-out room being movable horizontally between a retracted orientation within the recreational vehicle and an extended orientation exterior of the recreational vehicle;
   a rectangular roof aperture (50) formed in the roof of the slide-out room, the roof aperture being of a size to permit movement of a user there through, the roof aperture having side edges separated by a width between 70 and 80 percent of the width of the roof, the roof aperture having forward and rearward edges separated by a length between 20 and 30 percent of the length of the roof, a rectangular hatch (52) of a size to cover the roof aperture, a hinge (54) pivotally coupling the hatch to the roof of the slide-out room adjacent to and parallel with the exposed side, the hatch being movable between a closed orientation overlying the roof aperture and an open orientation extending upwardly at an obtuse angle from the roof of the slide-out room;
   a ladder (58) having a lower end supported on the floor of the slide-out room and an upper end located above the roof of the slide-out room and an intermediate extent extending through the roof aperture, laterally spaced recesses (60) formed in the roof aperture adjacent to the rearward end of the slide-out room, the ladder having laterally spaced downwardly extending projections (62) adjacent to the upper end, the projections being positionable in the recesses for selectively securing the ladder to the slide-out room during use while a user climbs to and from the roof of the slide-out room and the roof of the recreational vehicle; and a screening assembly (66), the screening assembly including a generally rectangular screen (68) with peripheral tubing (70) beneath the roof aperture, the screen and tubing having a size to essentially cover the roof aperture, the screen and tubing having forward and rearward edges and lateral side edges, laterally spaced guides (72) secured to the ceiling of the slide-out room and spanning the roof aperture, the guides being formed with channels slidably receiving the tubing along the lateral side edges of the screen, the tubing being reciprocable in the channels between a closed position closing the roof aperture and an open position opening the roof aperture.

\* \* \* \* \*